(12) United States Patent
Furukawa (10) Patent No.: US 7,734,896 B2
(45) Date of Patent: Jun. 8, 2010

(54) ENHANCED PROCESSOR ELEMENT STRUCTURE IN A RECONFIGURABLE INTEGRATED CIRCUIT DEVICE

(75) Inventor: Hiroshi Furukawa, Kawasaki (JP)

(73) Assignee: Fujitsu Microelectronics Limited, Yokohama (JP)

(*) Notice: Subject to any disclaimer, the term of this patent is extended or adjusted under 35 U.S.C. 154(b) by 0 days.

(21) Appl. No.: 11/390,131

(22) Filed: Mar. 28, 2006

(65) Prior Publication Data

US 2007/0074001 A1  Mar. 29, 2007

(30) Foreign Application Priority Data

Sep. 29, 2005  (JP)  ............... 2005-284725

(51) Int. Cl.
G06F 15/76  (2006.01)
(52) U.S. Cl. .............................. 712/15; 712/10; 712/11
(58) Field of Classification Search .................. 712/10, 712/11, 15, 226
See application file for complete search history.

(56) References Cited

U.S. PATENT DOCUMENTS

| | | | | |
|---|---|---|---|---|
| 4,748,585 A | * | 5/1988 | Chiarulli et al. ............... | 712/15 |
| 5,299,317 A | * | 3/1994 | Chen et al. .................. | 710/317 |
| 5,418,976 A | * | 5/1995 | Iida ............................ | 712/38 |
| 5,727,229 A | * | 3/1998 | Kan et al. ..................... | 712/22 |
| 6,185,667 B1 | * | 2/2001 | Abercrombie et al. ......... | 712/11 |
| 6,883,084 B1 | * | 4/2005 | Donohoe ....................... | 712/1 |
| 7,120,903 B2 | * | 10/2006 | Toi et al. ..................... | 717/149 |
| 7,568,084 B2 | | 7/2009 | Tanaka et al. | |
| 2002/0184291 A1 | | 12/2002 | Hogenauer | |
| 2002/0198911 A1 | * | 12/2002 | Blomgren et al. ........... | 708/232 |
| 2004/0133765 A1 | * | 7/2004 | Tanaka et al. ............... | 712/215 |
| 2009/0282213 A1 | | 11/2009 | Tanaka et al. | |

FOREIGN PATENT DOCUMENTS

| | | | |
|---|---|---|---|
| JP | 01-126819 | A | 5/1989 |
| JP | 05-324694 | A | 12/1993 |
| JP | 2000-311156 | A | 11/2000 |
| JP | 2001-312481 | A | 11/2001 |
| JP | 2004-171593 | A | 6/2004 |
| JP | 2005-044329 | A | 2/2005 |
| JP | 2005-510778 | A | 4/2005 |
| JP | 2005-128709 | A | 5/2005 |

* cited by examiner

Primary Examiner—David J Huisman
Assistant Examiner—William B Partridge
(74) Attorney, Agent, or Firm—Arent Fox LLP (57) ABSTRACT

A reconfigurable integrated circuit device which converts an arbitrary calculation state dynamically, based on configuration data, includes a plurality of processor elements, each of which has an input terminal, an output terminal, a plurality of arithmetic units which are provided in parallel and each of which performs calculation processing in synchronous with a clock signal, and an intra-processor network which connects them in an arbitrary state; and an inter-processor network which connects between processor elements in an arbitrary state. Based on configuration data, the intra-processor network is reconfigurable to a desired connection state, and further, based on the configuration data, the inter-processor network is reconfigurable to a desired connection state.

8 Claims, 12 Drawing Sheets

PROCESSOR ELEMENTS OF THIS EMBODIMENT

PROCESSOR ELEMENTS OF THIS EMBODIMENT

FIG.6

PROCESSOR ELEMENTS OF THIS EMBODIMENT

FIG.7

FIG.8 PROCESSOR ELEMENTS OF THIS EMBODIMENT

FIG.9 PROCESSOR ELEMENTS OF THIS EMBODIMENT

FIG.10
PROCESSOR ELEMENTS OF THIS EMBODIMENT

PROCESSOR ELEMENTS OF THIS EMBODIMENT

FIG.13

PROCESSOR ELEMENTS OF THIS EMBODIMENT

FIG.14
PROCESSOR ELEMENTS OF THIS EMBODIMENT

FIG.15

PROCESSOR ELEMENTS OF THIS EMBODIMENT

FIG.16
PROCESSOR ELEMENTS OF THIS EMBODIMENT

ENHANCED PROCESSOR ELEMENT STRUCTURE IN A RECONFIGURABLE INTEGRATED CIRCUIT DEVICE

CROSS-REFERENCE TO RELATED APPLICATIONS

This application is based upon and claims the benefit of priority from the prior Japanese Patent Application No. 2005-284725, filed on Sep. 29, 2005, the entire contents of which are incorporated herein by reference.

BACKGROUND OF THE INVENTION

1. Field of the Invention

The present invention relates to a reconfigurable integrated circuit device, and more particularly, relates to a novel structure for a processor element provided within a reconfigurable integrated circuit device.

2. Description of the Related Art

A reconfigurable integrated circuit device comprises a plurality of processor elements and a network which connects between these processor elements. And, as a response to an external or an internal event, a sequencer supplies configuration data to the processor elements and the network, and the processor and the network are set up into any desired calculation state, according to the configuration data.

A traditional prior art type programmable microprocessor reads out commands stored in a memory in order and processes them sequentially. With this type of microprocessor, there is a fixed limit to the processing capability, since the commands which can be executed simultaneously by a single microprocessor are limited in number.

On the other hand, in a dynamically reconfigurable integrated circuit device such as those proposed in recent years, there are provided in advance a plurality of processor elements which comprise combinations of logical arithmetic units (ALUs) which are endowed with the functions of adders, multipliers, comparators and the like, delay circuits, counters and so on; and, furthermore, a network is provided which connects between these processor elements. This plurality of processor elements and network are reconfigured to any desired structure by configuration data from a state transition control unit which includes a sequencer, and performs predetermined calculations in this calculation state. When the data processing in one calculation state has been completed, another calculation state is configured with a different set of configuration data, and different data processing is performed in this state.

By being reconfigured dynamically into different calculation states in this manner, the data processing capability with respect to large volumes of data is enhanced, and thus it is possible to enhance the overall processing efficiency. Such a reconfigurable integrated circuit device is, for example, described in Japanese Patent Laid-Open Publication 2001-312481.

SUMMARY OF THE INVENTION

With the above described prior art reconfigurable integrated circuit device, the processor element comprises a plurality of types of arithmetic units which are connected in series, and each of this plurality of arithmetic units constitutes a pipeline structure which operates in synchronous with a clock signal. This combination of arithmetic units is a combination of elements whose frequency of utilization is high, such as, for example, a combination of multipliers and cumulative adders or the like, and thereby it is made possible to obtain, at the same time, both flexibility and also increase in efficiency of utilization of the processor elements Thus, if the processor element is configured into such a calculation state that all of the internally combined arithmetic units are used, then, the efficiency of utilization is increased, also it becomes possible to perform high speed processing, because of no useless clock cycles in pipeline processing by the combined arithmetic units.

However, when configuring up a calculation state in which the combination of the arithmetic units within the processor element is completely different, the efficiency of utilization is deteriorated, also useless clock cycles occur in the pipeline processing, and high speed processing accordingly becomes impossible.

Thus, an object of the present invention is to provide a reconfigurable integrated circuit device, which comprises a processor element in which the flexibility is high, and useless clock cycles do not occur.

In order to attain the above described object, according to a first aspect of the present invention, there is a reconfigurable integrated circuit device which converts an arbitrary calculation state dynamically, based on configuration data, comprising:

a plurality of processor elements, each of which comprises an input terminal, an output terminal, a plurality of arithmetic units which are provided in parallel and each of which performs calculation processing in synchronous with a clock signal, and an intra-processor network which connects together the input terminal, the output terminal, and input and output ports of the plurality of arithmetic units in an arbitrary state; and an inter-processor network which connects between the plurality of processor elements in an arbitrary state; wherein:

based on configuration data, the intra-processor network is reconfigurable to a desired connection state, and further, based on the configuration data, the inter-processor network is reconfigurable to a desired connection state.

With the above described first aspect of the present invention, according to a desirable embodiment, each of the arithmetic units comprises an input port, a calculator which performs predetermined calculation processing on input data from the input port, a register which latches the output of the calculator in response to a clock signal, and an output port which outputs the data in the register; and each of the arithmetic units performs the predetermined calculation processing and outputs the calculation result in one clock cycle.

With the above described first aspect of the present invention, according to another desirable embodiment, in the processor elements, the intra-processor network is configured based on the configuration data so that the plurality of incorporated arithmetic units are connectable in series in an arbitrary order.

With the above described first aspect of the present invention, according to another desirable embodiment, in the processor elements, the intra-processor network is configured based on the configuration data, so that a single incorporated arithmetic unit outputs the result of calculation processing at the output terminal in a single clock cycle.

Since, according to the above described invention, in the processor elements, a plurality of arithmetic units are arranged in parallel, and this plurality of arithmetic units are connected via a network so as to be able to be reconfigured in an arbitrary order, or since they are connected so as to be able to be reconfigured with a single arithmetic unit, accordingly the flexibility is high, and useless clock cycles do not occur.

DESCRIPTION OF THE PREFERRED EMBODIMENTS

In the following, the present invention will be explained in terms of preferred embodiments thereof. However, the technical scope of the present invention is not limited to these embodiments, but rather is to be defined by the scope of the appended claims and equivalents thereof.

Figure 1:
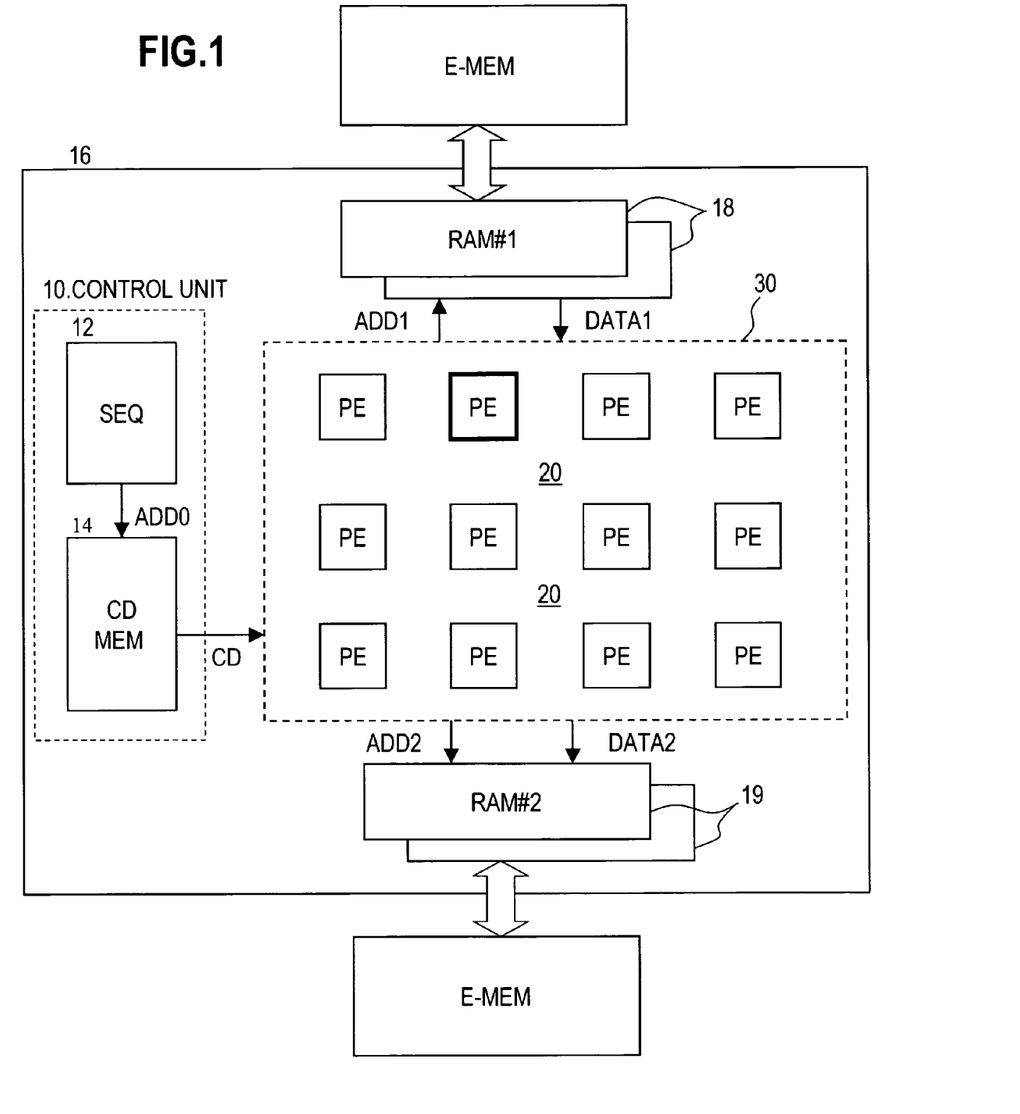
FIG. 1 is a block diagram of a reconfigurable integrated circuit device according to a preferred embodiment of the present invention.

FIG. 1 is a block diagram showing the structure of a reconfigurable integrated circuit device according to the preferred embodiment. This reconfigurable integrated circuit device 16 comprises internal memories 18 and 19, a reconfigurable processor element array 30, and a control unit 10. The processor element array 30 comprises a plurality of processor elements PE, and a inter-processor network 20 which connects between these processor elements PE. Furthermore, the control unit 10 comprises a sequencer 12 and a configuration data memory 14, and the processor element array 30 is dynamically configured into any arbitrary calculation state by configuration data CD from this control unit 10. Accordingly, by changing the configuration data CD, the processor element array 30 can be configured into a different calculation state. Furthermore, data is transferred from an external memory E-MEM to the internal memory 18, for example by direct memory access, and the calculation state which has been configured within the processor element array 30 performs predetermined data processing on this data, with the data resulting from this processing being transferred from the internal memory 19 to the external memory E-MEM.

Figure 2:
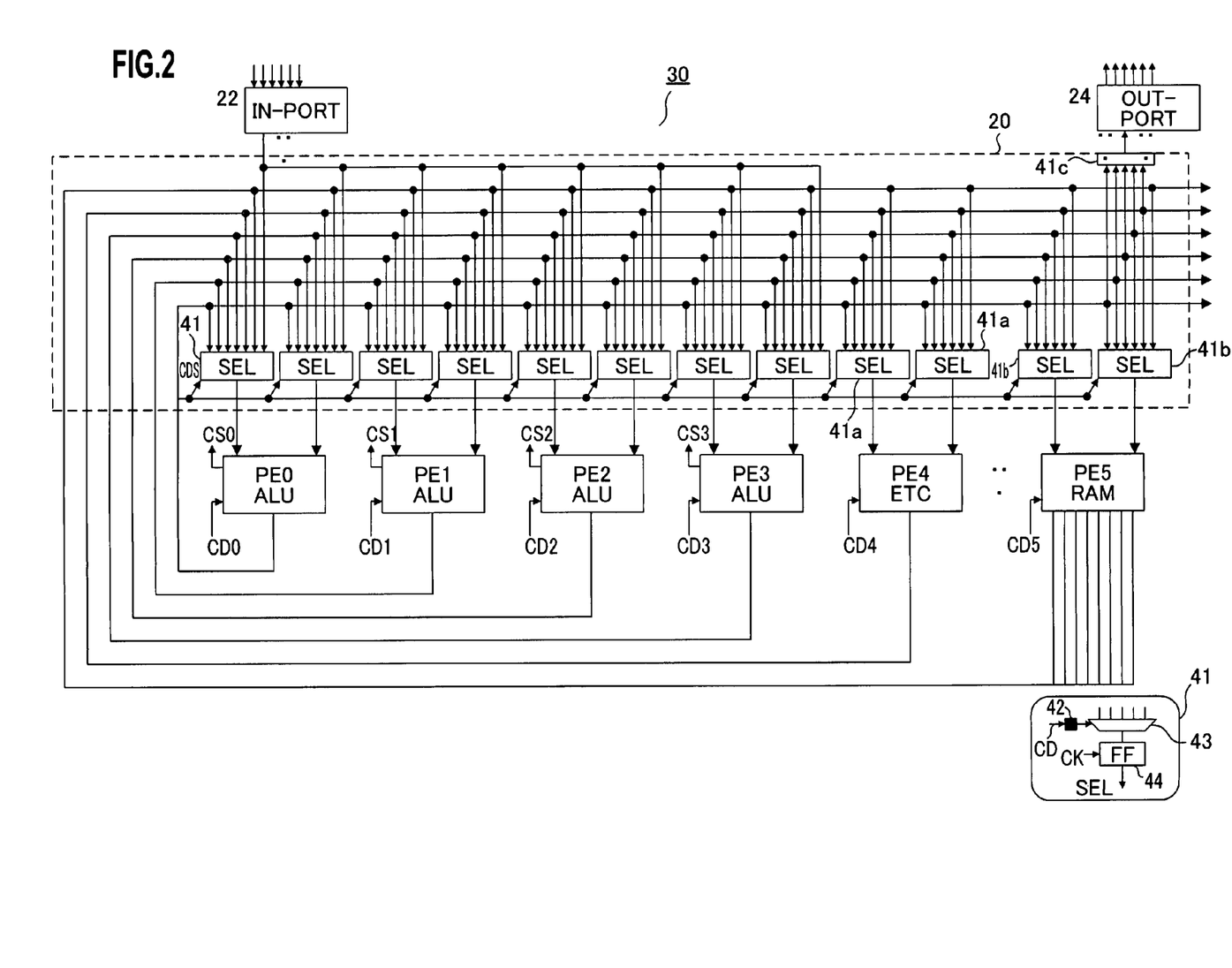
FIG. 2 is a figure showing an example of the structure of a processor element array 30 of this embodiment.

FIG. 2 is a figure showing an example of the structure of a processor element array 30 of this embodiment. Calculation processor elements PE0 through PE3, a memory processor element PE5, and other devices, for example, a processor element PE4 for a delay circuit, are configured so as to be connectable via selectors 41, which are switches in the inter-processor element network 20. The processor elements PE1 through PE5 can be configured to any arbitrary structure, based on configuration data CD0 through CD5; and furthermore, the selectors 41 (41a, 41b, 41c) in the network 20 can be configured to any arbitrary connection state, based on configuration data CDS.

When each of the processor elements PE finishes its calculation processing, it outputs a completion signal CS0 through CS3. These completion signals are supplied to the sequencer 12 of the control unit 10 (refer to FIG. 1), and the next configuration data CD is supplied at an appropriate timing to the processor elements PE and the inter-processor network 20, so as to configure another calculation state.

Each of the selectors 41, of which one example is shown in the lower right of the figure, comprises a register 42 which stores the configuration data CD, a selector circuit 43 which selects an input according to the data in the register 42, and a flip-flop 44 which is synchronized with a clock signal CLK and latches the output of the selector circuit 43. Accordingly, the selector 41 selects and outputs any arbitrary input, according to the configuration data CD. Furthermore, the network 20 also connects in any arbitrary state by the selectors between the input unit 22, the output unit 24, and the processor elements.

Figure 3:
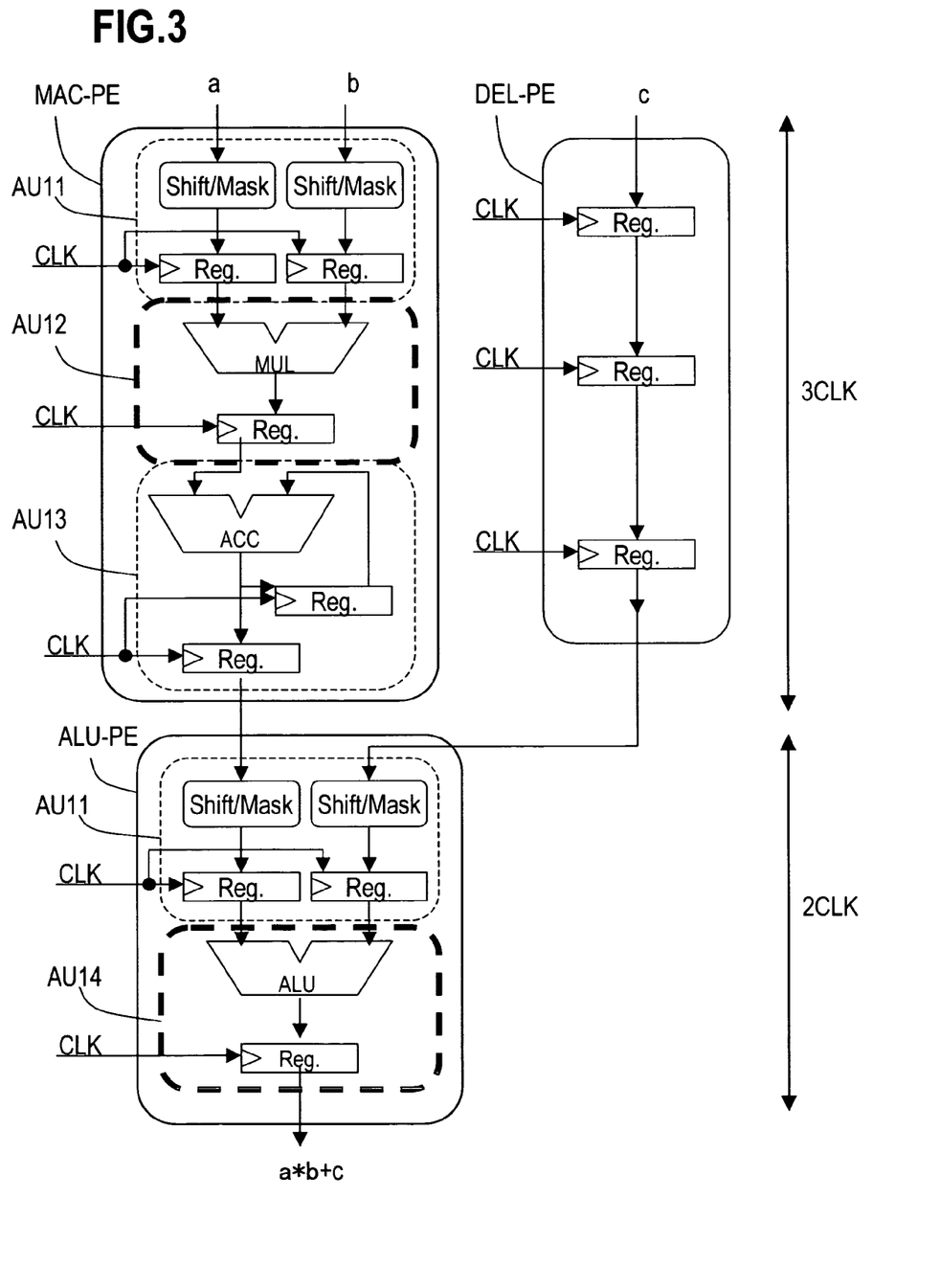
FIG. 3 is a figure for explanation of a problem point with such a general processor element.

FIG. 3 is a figure for explanation of a general problem point with such processor elements. Generally, a processor element consists of a combination of arithmetic units whose frequency of use is high. In FIG. 3, for this example, there are shown a MAC (Multiplier Accumulator) processor element MAC-PE in which a shift/mask arithmetic unit AU11, a multiplication arithmetic unit AU12, and a cumulative addition arithmetic unit AU13 are connected in series, and an ALU processor element ALU-PE in which a shift/mask arithmetic unit AU11 and an ALU arithmetic unit AU14 are connected in series. Furthermore, a delay processor element DEL-PE comprises a plurality of registers Reg connected in series.

The shift/mask arithmetic unit AU11 included in the MAC processor element MAC-PE comprises two groups, each comprising a shift/mask circuit (Shift/Mask) including a shift circuit which shifts the bits of the input data and a mask circuit which masks a portion of these bits, and a register Reg which responds to a clock signal CLK to latch the output of the shift/mask circuit. Furthermore, the multiplication arithmetic unit AU12 comprises a multiplier MUL which multiplies together two items of input data, and a register Reg which is synchronized by a clock signal CLK to latch the output of this multiplier. And the cumulative addition arithmetic unit AU13 comprises a cumulative adder ACC which adds the input data to the cumulative data in a register, and two registers Reg. Furthermore, the ALU arithmetic unit AU14 which is comprised in the ALU processor element ALU-PE comprises an ALU which performs addition, subtraction, and logical operation, and a register Reg.

The above described shift/mask circuit, multiplier MUL, cumulative adder ACC, and ALU within each of the above described arithmetic units are configured to the desired circuit by the configuration data, not shown in the figure. For example, the shift direction, the amount of shift, the mask position and so on are set in the shift/mask circuit, and thereby a arithmetic unit is constituted which is endowed with the desired shift function or mask function. However, their serial connection is fixed.

In FIG. 3, there is shown an arithmetic circuit which has been configured so as to perform the calculation a*b+c on inputs a, b, and c with a MAC processor element MAC-PE, an ALU processor element ALU-PE, and a delay processor element DEL-PE. In the MAC processor element MAC-PE, the inputs a and b pass through the shift/mask arithmetic unit AU11 without any processing being performed thereby, and then the multiplication (a*b) is performed on them by the multiplication calculation element AU12, and the result passes just as it is through the cumulative addition arithmetic unit AU13 and is outputted. Accordingly, it is the case that a latency of three clock cycles is required until the result of this multiplication is outputted.

On the other hand, the input c is delayed by three clock cycles by the delay processor element DEL-PE, and is then outputted. Due to this three clock cycle delay, the multiplication result a*b and the input c are inputted to the ALU processor element ALU-PE at the same timing. The two items of input data pass through the shift/mask arithmetic unit AU11 without any processing being performed thereon by this processor element, and are supplied to the ALU arithmetic unit AU14, which adds together both of these items of input data, and outputs the result of this addition. In other words, the addition result (a*b+c) is outputted with a latency of two clock cycles in the ALU processor element ALU-PE.

That is, in the MAC processor element MAC-PE, only the MUL arithmetic unit AU12 is used, while the shift/mask arithmetic unit AU11 and the cumulative addition arithmetic unit AU13 only pass data through, and do not perform any calculation processing thereon. However, since these three arithmetic units are connected in series, the result of calculation upon the input data a and b is outputted after a latency of three clock cycles in these MAC processor elements MAC-PE. Furthermore, in the ALU processor element ALU-PE, only the ALU arithmetic unit AU14 is used, while the shift/mask arithmetic unit AU11 only passes through data, without performing any calculation processing thereon. Accordingly, the result of calculation (a*b+c) is outputted by the ALU processor element ALU-PE after a latency of two clock cycles.

As a result, in the calculation processing of multiplying together the input data items a and b, and adding the input data item c to the result of this multiplication, a latency of five clock cycles is required, so that the speed of the calculation processing becomes slow. Furthermore, only the one arithmetic unit AU12 in the processor element MAC-PE is used, and only the one arithmetic unit AU14 in the processor element ALU-PE is used, so that the efficiency of use of the circuitry becomes low.

Figure 4:
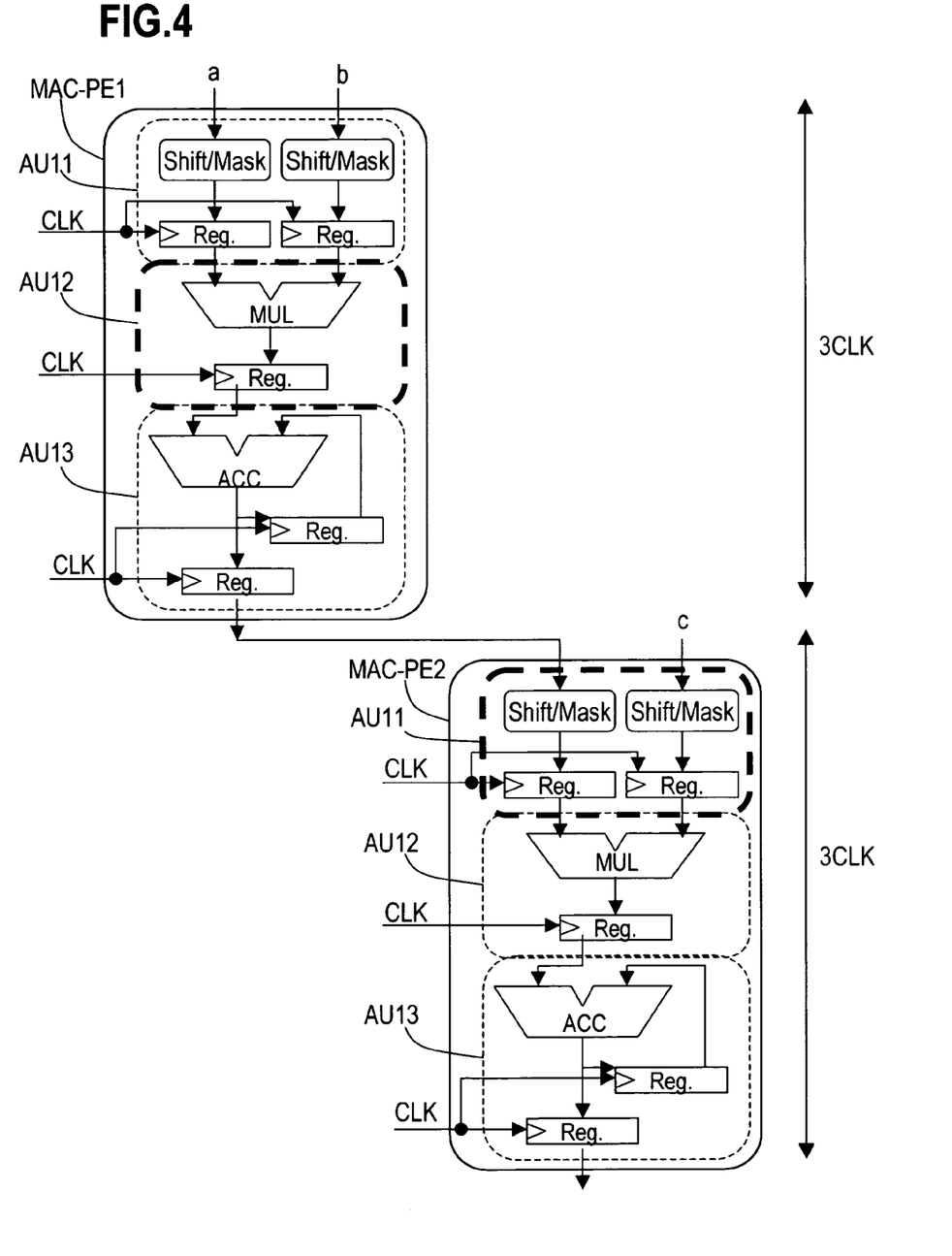
FIG. 4 is another figure for explanation of a problem point with such a general processor element.

FIG. 4 is another figure for explanation of the general problem point with such processor elements. In FIG. 4, there are used two MAC processor elements MAC-PE, in each of which a shift/mask arithmetic unit AU11, a multiplication arithmetic unit AU12, and a cumulative addition arithmetic unit AU13 are connected in series. And the multiplication arithmetic unit AU12 of the first MAC processor element MAC-PE1 and the shift/mask arithmetic unit AU11 of the second MAC processor element MAC-PE2 are used in order to configure a calculation state in which after having multiplied together the input data items a and b, outputs a portion of the data of the multiplication result by shift processing and mask processing. The other arithmetic units only simply pass data through, and do not perform any calculation processing.

In this case, a latency of three clock cycles is required by each of the MAC processor elements, so that a total latency of six clock cycles is required, which is not desirable. Moreover, the efficiency of utilization of the circuitry becomes low.

In the case, such as that above, of a processor element which consists of a combination of a plurality of arithmetic units which are connected in series, when using a circuit consisting of this combination just as it is, the efficiency of utilization of the circuitry becomes high, and also it does not happen that the latency becomes slow; but, when configuring a circuit which is different from the circuit combination, the efficiency of utilization of the circuitry becomes low, and also the latency becomes unnecessarily long.

Figure 5:
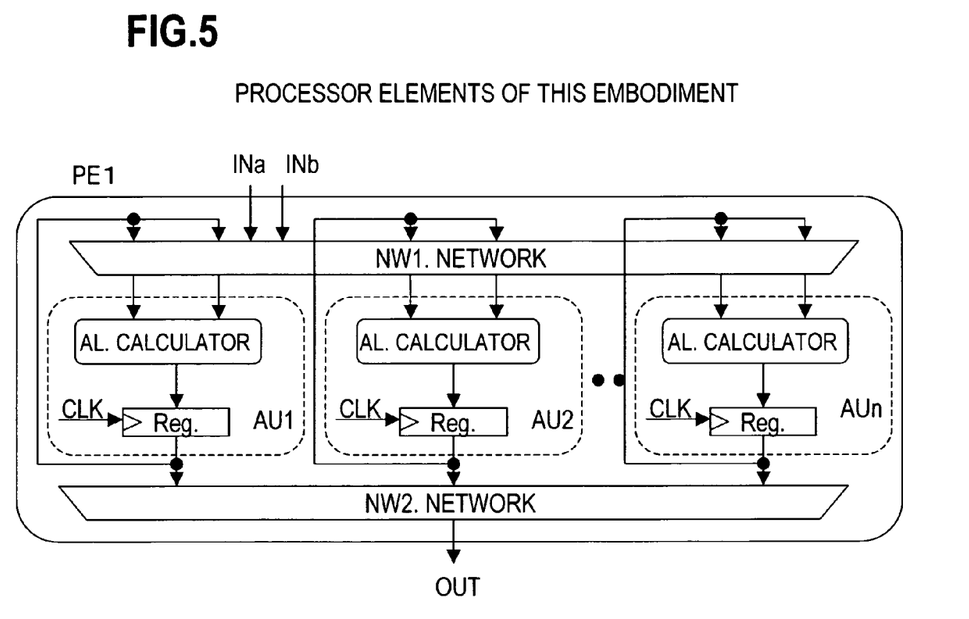
FIG. 5 is a block diagram showing the structure of a processor element of this embodiment.

FIG. 5 is a block diagram showing a processor element according to this preferred embodiment. This processor element PE1 comprises two input terminals Ina and INb, an output terminal OUT, a plurality of arithmetic units AU1 through AUn which are provided in parallel and each of which performs its own calculation processing in synchronous with a clock signal CLK, and intra-processor networks NW1 and NW2 within the processor element, which arbitrarily connect the input/output terminals to the input/output ports of the arithmetic units AU1 through AUn. These networks NW1 and NW2 within the processor element comprises a plurality of selectors, in the same manner as did the network between processor elements shown in FIG. 2. Furthermore, each of the arithmetic units comprises a calculator AL and a register Reg which latches the output of the calculation AL in synchronous with a clock signal, and outputs the result of calculation with a latency of one clock cycle, in principle. However, if the calculator AL requires complicated processing, it also may happen that it outputs the result of its calculation with a latency of a plurality of clock cycles.

The plurality of arithmetic units comprise one or a plurality of units, each of which performs different calculation processing. The combinations of types and numbers of these arithmetic units are selected so as to increase the efficiency of utilization of the circuits. As will be explained hereinafter with a concrete example, predetermined numbers of each of shift/mask arithmetic units, multiplication arithmetic units, cumulative addition arithmetic units, ALU arithmetic units, rounding arithmetic units and so on are provided in a predetermined combination within the processor element.

Figure 6:
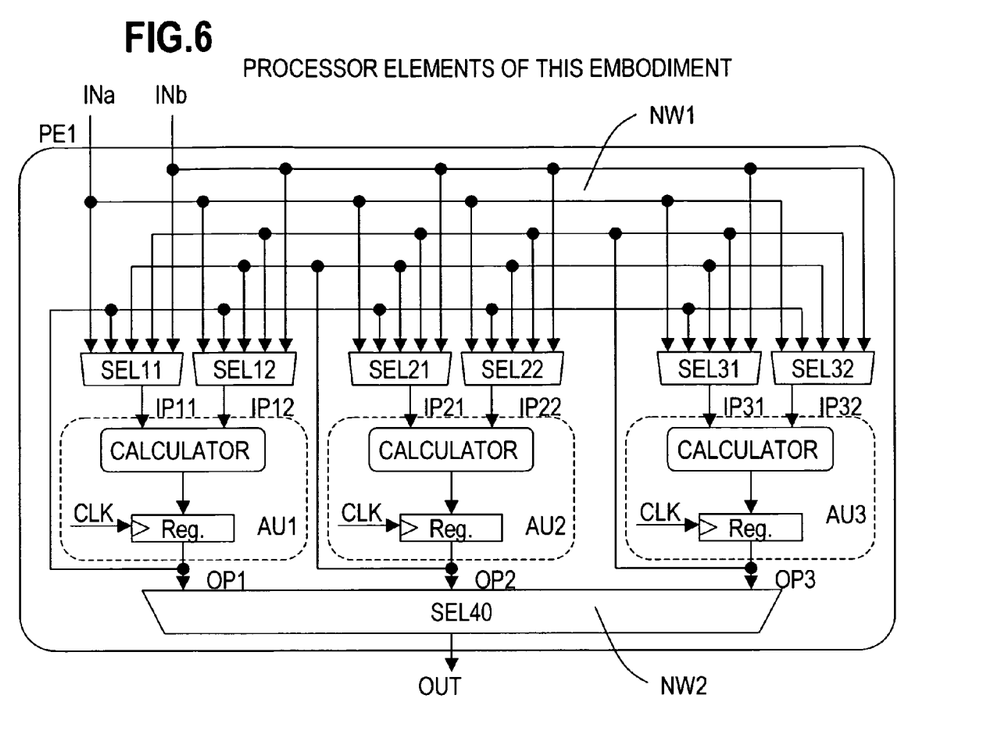
FIG. 6 is a figure showing the structure of a network within a processor element of this embodiment.

FIG. 6 is a figure showing the structure of a network within the processor element of this embodiment. For the sake of simplicity, only three arithmetic units AU1 through AU3 are shown. This network within the processor element comprises first and second networks NW1 and NW2. The first network NW1 comprises selectors SEL 11, 12 through SEL 31, 32 which correspond to the two input ports of the arithmetic units AU1 through AU3, and each of these selectors is a switch which connects any of the two input terminals INa and INb and the three output ports OP1 through OP3 to the two input ports IP1, IP2 through IP31, IP32 respectively. Furthermore, the second network NW2 is a switch which connects any one of the output ports OP1 through OP3 of the three arithmetic units to the output terminal OUT.

Figure 7:
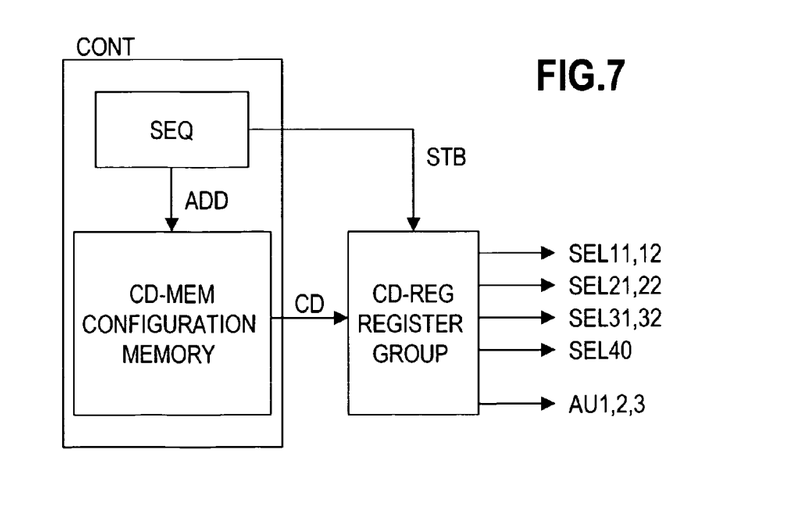
FIG. 7 is a block diagram showing the structure of a control unit of this embodiment.

FIG. 7 is a block diagram showing the structure of a control unit according to this embodiment. This control unit CONT comprises a sequencer SEQ, a configuration memory CD-MEM, and a configuration data register CD-REG which latches the configuration data CD. The sequencer SEQ outputs an address ADD at a predetermined timing so as to cause configuration data CD corresponding to this timing to be outputted from the configuration memory CD-MEM, and, at the same time, outputs a strobe signal STB to latch this configuration data CD in the configuration data register CD-REG. From this register, configuration data is outputted to each of the selectors of the networks within the processor element of FIG. 6, and configuration data is outputted to each of the arithmetic units AU1 through AU3.

Each of the arithmetic units AU1 through AUn of FIGS. 5 and 6 is configured into the arbitrary calculation state by the configuration data CD, and also the networks NW1, NW2 within the processor element are configured into the arbitrary connection state by the configuration data CD. For example, in the first network NW1 within the processor element, the input terminals INa, INb and the input ports IP of the arbitrary arithmetic units AU1 through AUn are connected together by the selectors SEL11 to SEL32, and, furthermore, the output ports OP of the arbitrary arithmetic units and the input ports IP of other arbitrary arithmetic units are connected together, thereby configuring an arithmetic circuit as a combination of the desired arithmetic units.

In this manner, by providing the plurality of arithmetic units AU1 through AUn in parallel, and by configuring the networks NW1, NW2 within the processor element into the arbitrary connection state, it is possible to connect any arbitrary combination of the arithmetic units in series, and to connect only arbitrary arithmetic units to the input and output terminals, thus configuring an optimized circuit which outputs the result of calculation with the shortest possible latency.

Figure 8:
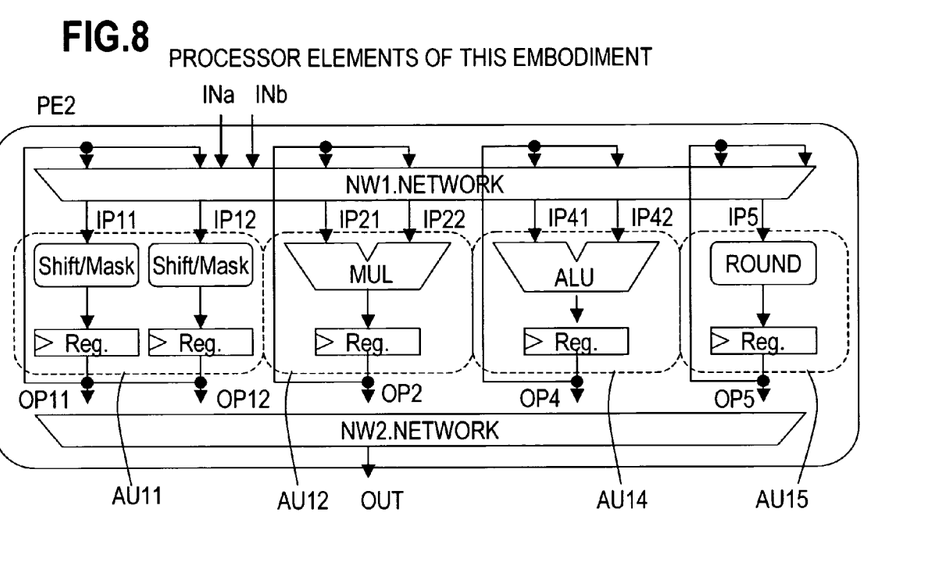
FIG. 8 is a figure showing an example of a processor element of this embodiment.

FIG. 8 is a figure showing an example of a processor element of this embodiment. This processor element PE2 comprises input terminals INa, INb, an output terminal OUT, networks NW1, NW2 within the processor element, a shift/mask arithmetic unit AU11, a multiplication arithmetic unit AU12, an ALU arithmetic unit AU14, and a rounding arithmetic unit AU15. These four arithmetic units AU are provided in parallel, and, by the networks NW1, NW2 within the processor element, the input terminals INa, INb and the output port OP of any of the arithmetic units are connected to the input port IP of any of the arithmetic units, and the output terminal OUT is connected to the out put port OP of any of the arithmetic units. It should be understood that the rounding arithmetic unit AU15 comprises a rounding processor ROUND which rounds off less significant bits, and a register Reg which latches the output thereof.

Figure 9:
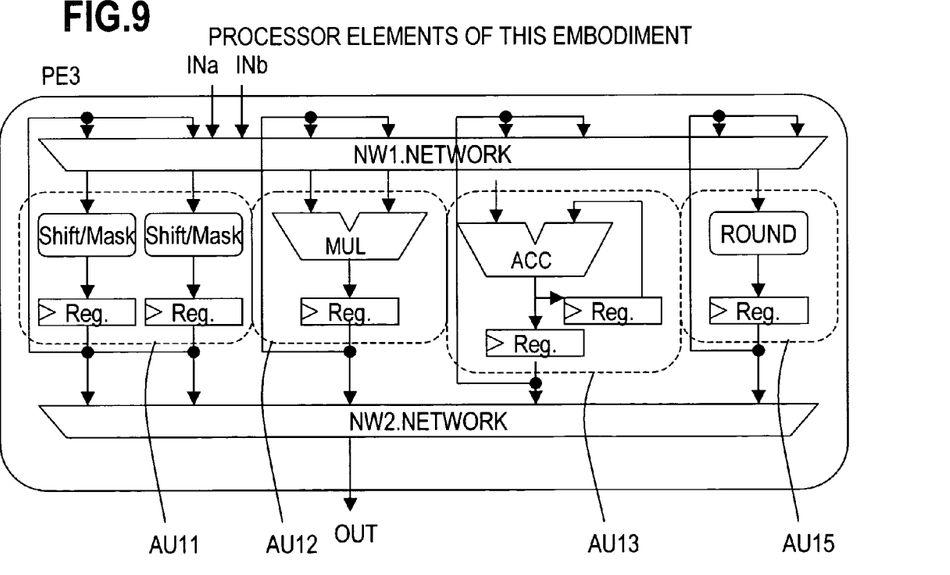
FIG. 9 is a figure showing another example of a processor element of this embodiment.

FIG. 9 is a figure showing another example of a processor element of this embodiment. This processor element PE3 comprises input terminals INa, INb, an output terminal OUT, networks NW1, NW2 within the processor element, a shift/mask arithmetic unit AU11, a multiplication arithmetic unit AU12, a cumulative addition arithmetic unit AU13, and a rounding arithmetic unit AU15. These four arithmetic units AU are provided in parallel, and, by the networks NW1, NW2 within the processor element, the input terminals INa, INb and the output port of any of the arithmetic units are connected to the input port of any of the arithmetic units, and the output terminal OUT is connected to the output port of any of the arithmetic units.

Figure 10:
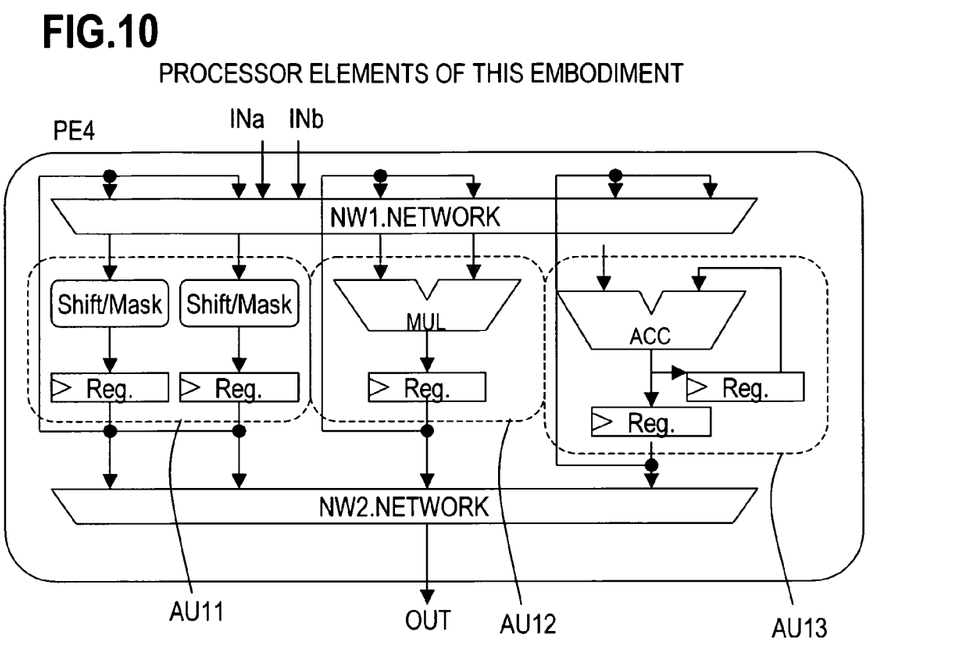
FIG. 10 is a figure showing still another example of a processor element of this embodiment.

FIG. 10 is a figure showing still another example of a processor element of this embodiment. This processor element PE4 comprises input terminals INa, INb, an output terminal OUT, networks NW1, NW2 within the processor element, a shift/mask arithmetic unit AU11, a multiplication arithmetic unit AU12, and a cumulative addition arithmetic unit AU13. These three arithmetic units AU are provided in parallel, and, by the networks NW1, NW2 within the processor element, the input terminals INa, INb and the output port of any of the arithmetic units are connected to the input port of any of the arithmetic units, and the output terminal OUT is connected to the output port of any of the arithmetic units.

Figure 11:
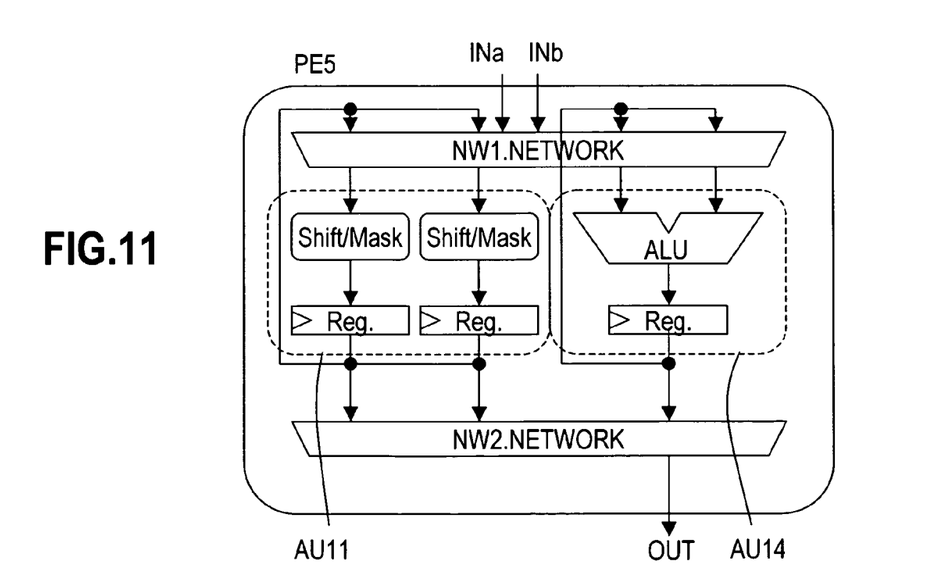
FIG. 11 is a figure showing yet another example of a processor element of this embodiment.

FIG. 11 is a figure showing yet another example of a processor element of this embodiment. This processor element PE5 comprises input terminals INa, INb, an output terminal OUT, networks NW1, NW2 within the processor element, a shift/mask arithmetic unit AU11, and an ALU arithmetic unit AU14. These two arithmetic units AU are provided in parallel, and are connected together by the networks NW1, NW2 within the processor element.

Figure 12:
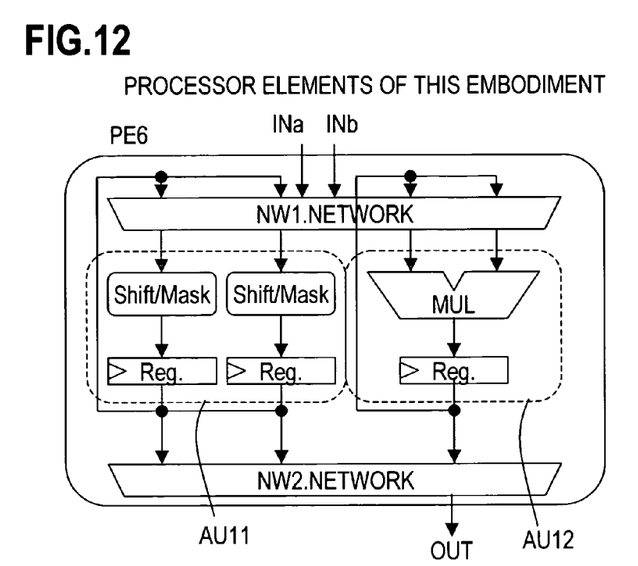
FIG. 12 is a figure showing still yet another example of a processor element of this embodiment.

FIG. 12 is a figure showing still yet another example of a processor element of this embodiment. This processor element PE6 comprises input terminals INa, INb, an output terminal OUT, networks NW1, NW2 within the processor element, a shift/mask arithmetic unit AU11, and a multiplication arithmetic unit AU12. These two arithmetic units AU are provided in parallel, and are connected together by the networks NW1, NW2 within the processor element.

Figure 13:
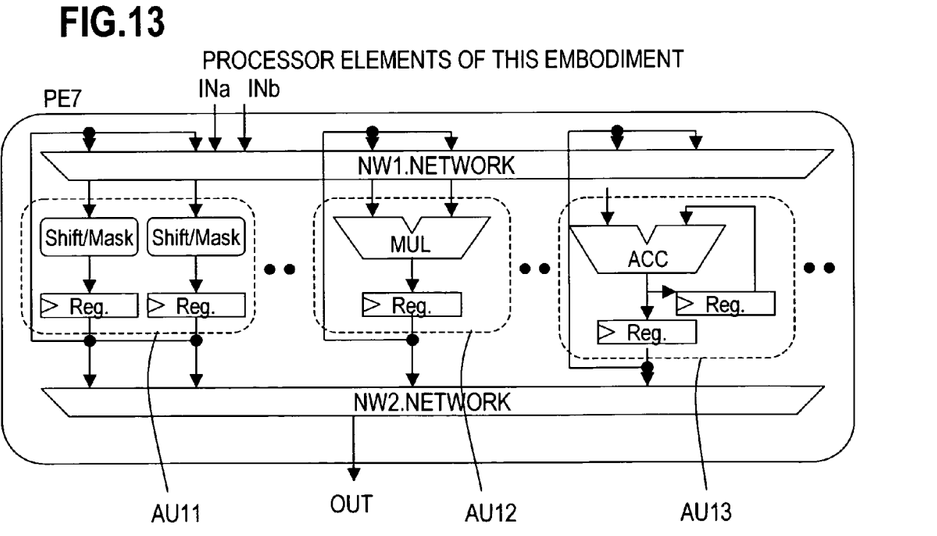
FIG. 13 is a figure showing even yet another example of a processor element of this embodiment.

FIG. 13 is a figure showing even yet another example of a processor element of this embodiment. This processor element PE7 comprises input terminals INa, INb and an output terminal OUT, networks NW1, NW2 within the processor element, a plurality of shift/mask arithmetic units AU11, a plurality of multiplication arithmetic units AU12, and a plurality of cumulative addition arithmetic units AU13. Each of these pluralities of the three types of arithmetic units AU are provided in parallel, and, by the networks NW1, NW2 within the processor element, the input terminals INa, INb and the output port of any of the arithmetic units are connected to the input port of any of the arithmetic units, and the output terminal OUT is connected to the output port of any of the arithmetic units. It is also possible to make combinations different from those of the example in Fig. 13, in other words, combinations in which respective arithmetic units AU are provided in a plurality are possible.

Although, in the above, representative combinations of arithmetic units have been explained as processor elements of this embodiment, combinations other than the ones described above maybe employed; and combinations with other types of arithmetic unit maybe employed. In any case, the arithmetic units are provided in parallel, and, by the networks within the processor element, they are connected in any arbitrary combination and moreover in any arbitrary order, in series. Or, only arbitrary one of the arithmetic units is also connected to the input terminals and to the output terminal.

Figure 14:
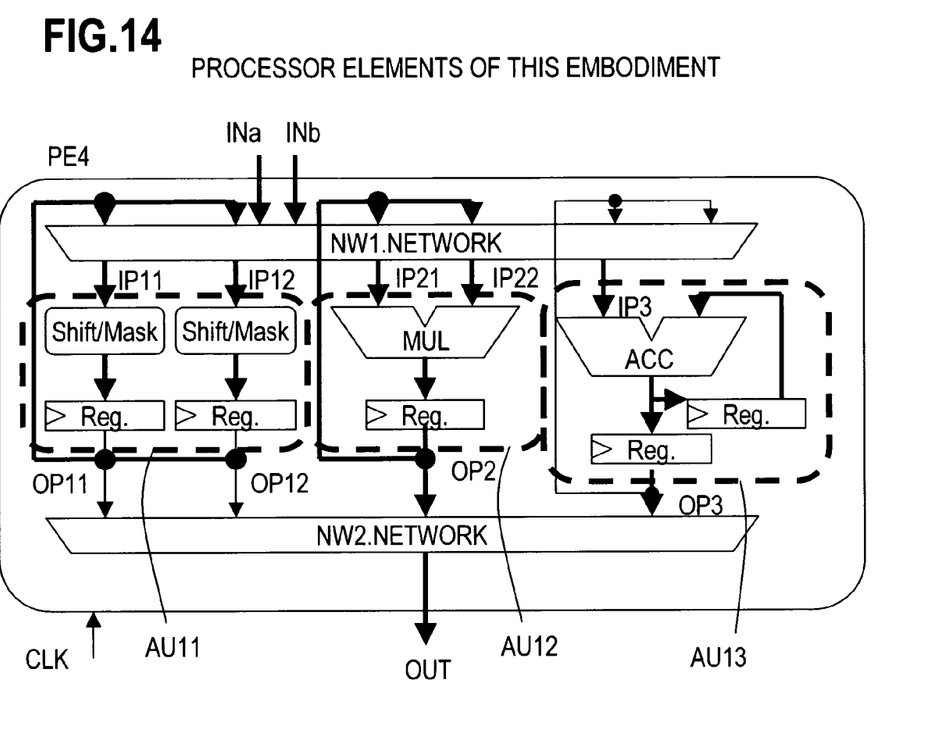
FIG. 14 is a figure showing an example of a connection state of processor elements of this embodiment.

FIG. 14 is a figure showing an example of a connection state of a processor element of this embodiment. In this example, the MAC processor element shown in FIGS. 3 and 4 is configured by the processor element PE4 shown in FIG. 10. That is, the first network NW1 connects the input terminals INa, INb to the input ports IP11, IP12 of the shift/mask arithmetic unit AU11, connects its output ports OP11, OP12 to the input ports IP21, IP22 of the multiplication arithmetic unit AU12, connects its output port OP2 to the input port IP3 of the cumulative addition arithmetic unit 13, and the second network NW2 connects the output port OP3 of this cumulative addition arithmetic unit 13 to the output terminal OUT. These connections are performed by the configuration data setting the selection inputs of the selectors within the networks.

By establishing connections in this manner, a structure is configured in which the three arithmetic units AU11, AU12, and AU13, which are provided in parallel, have been connected in series. And, since these arithmetic units AU11, AU12, and AU13 output the results of their calculations with a latency of one clock cycle, as synchronized with the clock signal CLK, by connecting these three arithmetic units in series, the multiply and accumulation result is outputted with a latency of three clock cycles. Accordingly, it is possible to implement the same structure as that of the MAC processor element shown in FIGS. 3 and 4.

Figure 15:
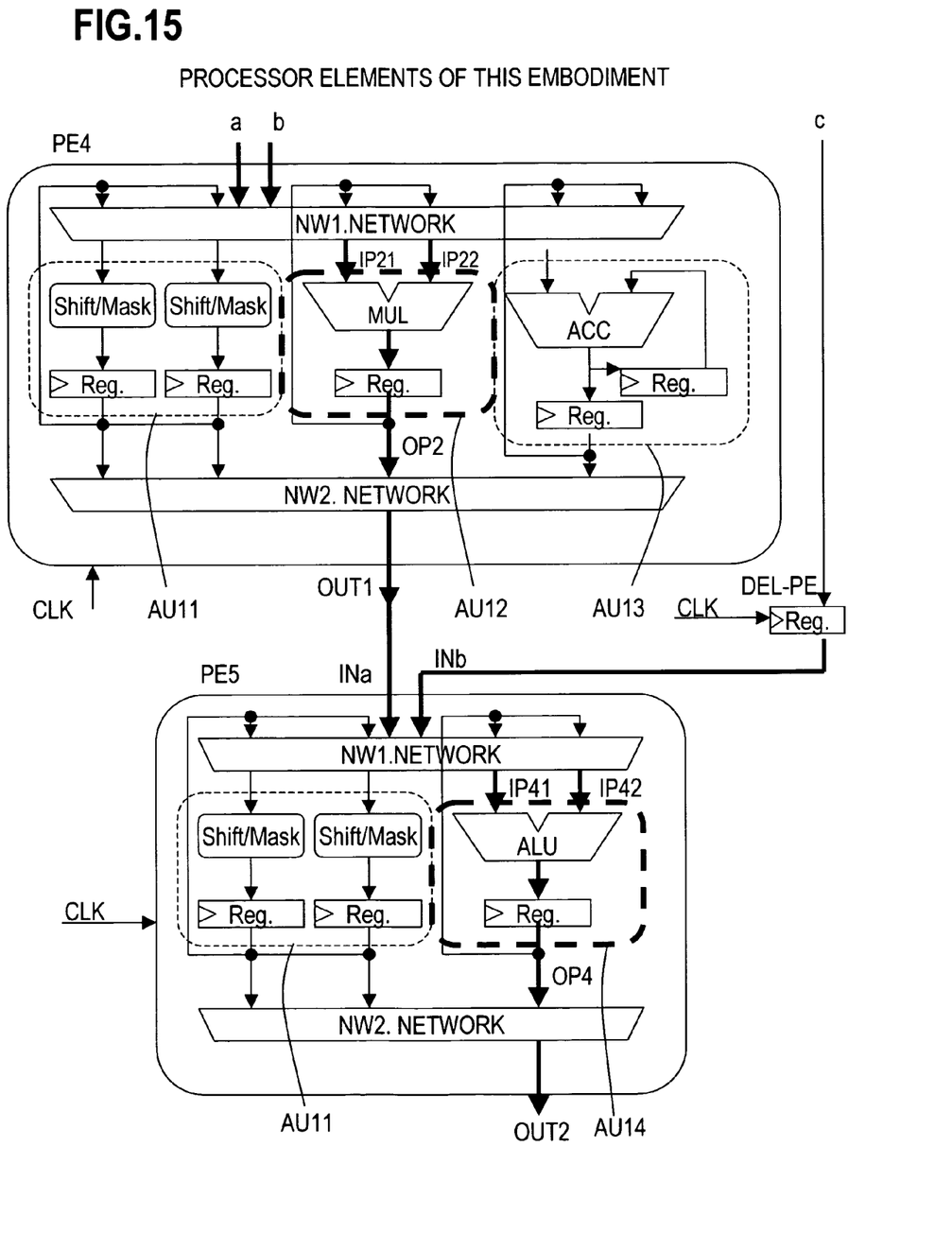
FIG. 15 is a figure showing another example of a connection state of processor elements of this embodiment.

FIG. 15 is a figure showing another example of a connection state of a processor element of this embodiment. In this example, a circuit which performs the same calculation (a*b+c) as in FIG. 3 is configured by utilizing the processor element PE4 of FIG. 10 and the processor element PE5 of FIG. 11. That is, in the processor element PE4, the inputs a and b are connected by the selectors within the first network NW1 to the input ports IP21 and IP22 of the multiplication arithmetic unit AU12, and its output port OP2 is connected by the selectors within the second network NW2 to the output terminal OUT1. Furthermore, its output terminal OUT1 is connected to the input terminal INa of the processor element PE5. Moreover, the input c is delayed by one clock cycle by the register of the delay processor element DEL-PE, and then is supplied to the input terminal INb of the processor element PE5. In this processor element PE5, the input terminals INa, INb are connected by the selectors within the first network NW1 to the input ports IP41, IP42 of the ALU arithmetic unit AU14, and its output port OP4 is connected by the selectors within the second network NW2 to the output terminal OUT2.

By this type of connection, the multiplication arithmetic unit AU12 within the processor element PE4 outputs the multiplication result (a*b) with a latency of one clock cycle, and the ALU arithmetic unit AU14 within the processor element PE5 outputs the addition result (a*b+c) with a latency of one clock cycle. Accordingly, the calculation result (a*b+c) is outputted with a latency of two clock cycles, so that it is possible to reduce the delay in the calculation, thus increasing its speed.

Figure 16:
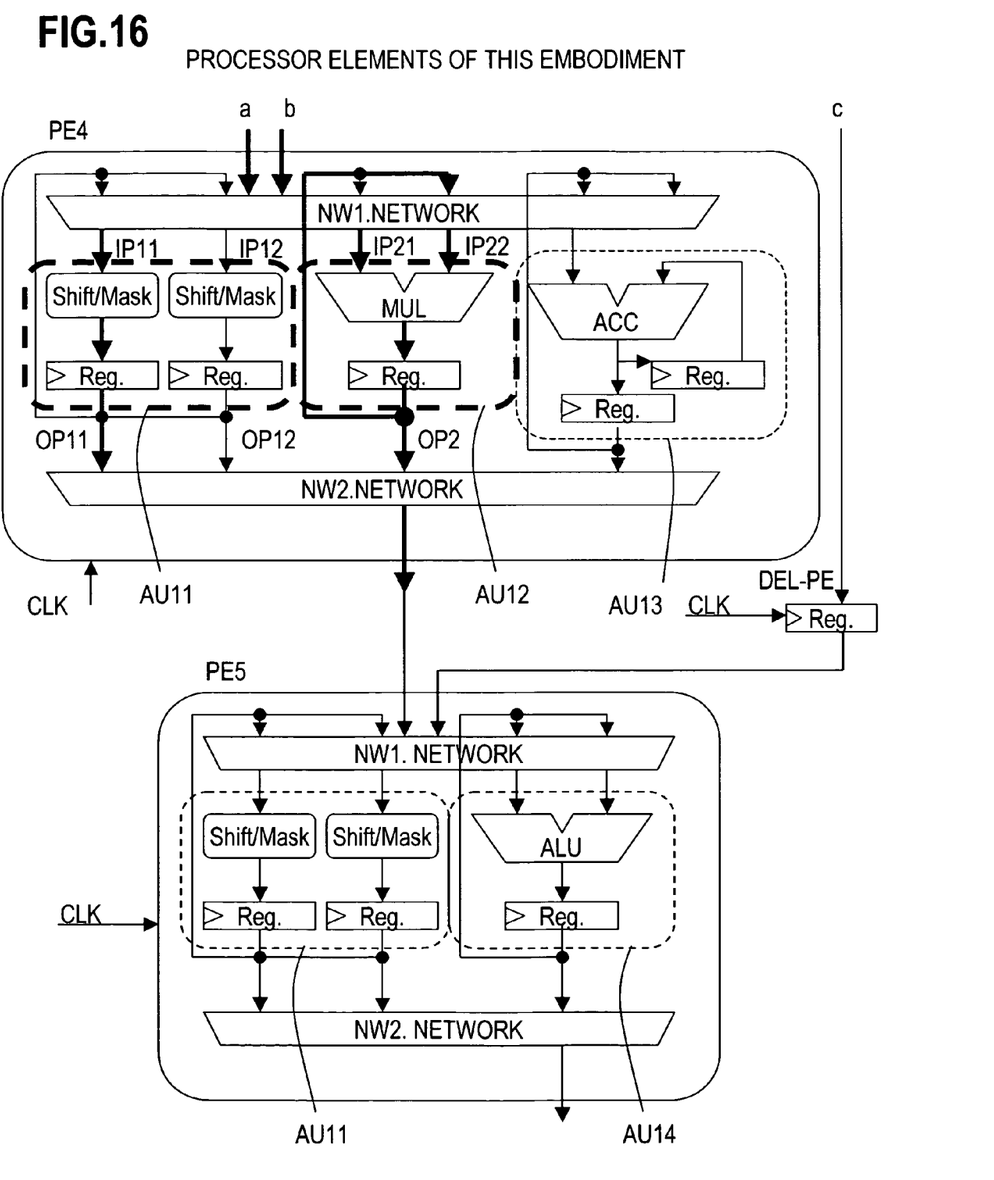
FIG. 16 is a figure showing yet another example of a connection state of processor elements of this embodiment.

FIG. 16 is a figure showing yet another example of a connection state of a processor element of this embodiment. In this example, a circuit which performs the same calculation of (a*b) and shift/mask processing as in FIG. 4 is configured by utilizing only the processor element PE4 of FIG. 10. In the processor element PE4, the inputs a and b are connected by the selectors within the first network NW1 to the input port IP21, IP22 of the shift/mask arithmetic unit AU12, its output port OP2 is connected by the selectors within the first network NW1 to the input port IP11 of the shift/mask arithmetic unit AU11, and its output port OP11 is connected by the selectors within the second network NW2 to the output terminal OUT.

In other words, the multiplication arithmetic unit AU12 and the shift/mask arithmetic unit AU11 are configured to be connected in series as shown by the thick lines, and it is possible to perform the multiplication (a*b) and shift/mask processing on it at a latency of two clock cycles, so that, as compared with the case of FIG. 4, it is possible to reduce the amount of delay, thus increasing the speed of the calculation.

Apart from the above described three examples, it is also possible to implement a connection state by combining arithmetic units in various different ways. And it is possible to output the results of calculation by the arithmetic circuits which are configured in this manner with a latency of a minimum number of clock cycles.

As described above, with this embodiment, within the processor element, the plurality of arithmetic units are provided in parallel, so that, with the selectors in the intra-processor element network, it is possible to connect the input terminals and the input ports of these units, the output ports and the input ports of the units, and the output ports of the units and the output terminals, in any arbitrary combination. Accordingly, a circuit which has been configured by connection by the network within this processor element is able to output its calculation result with a short latency. Furthermore, it is possible to enhance the efficiency of utilization of these units within the processor element by appropriately selecting their types.

What is claimed is:

1. A reconfigurable integrated circuit device which converts an arbitrary calculation state dynamically, based on configuration data, comprising:

a plurality of processor elements, each of which comprises a plurality of input terminals, an output terminal, a plurality of arithmetic units which are provided in parallel and each of which performs calculation processing in synchronous with a clock signal, and an intra-processor element network which connects together said input terminals, and input and output ports of said plurality of arithmetic units in an arbitrary state; and an inter-processor element network which connects between said plurality of processor elements in an arbitrary state, wherein:

said intra-processor element network has a plurality of first selectors, provided corresponding to all of the input ports of said plurality of arithmetic units, each of which has inputs connected to all of the input terminals and directly connected to all of the output ports of said arithmetic units, and an output connected to the corresponding input port of the arithmetic unit, said intra-processor element network further has a second selector having inputs connected to all of the output ports of the arithmetic units and an output connected to the output terminal, said intra-processor element network is reconfigurable to a desired connection state based on configuration data provided to the first selectors and the second selector, and further, said inter-processor element network is reconfigurable to a desired connection state based on said configuration data.

2. The reconfigurable integrated circuit device according to claim 1, further comprising a configuration data memory which stores said configuration data, and a sequencer which, in response to a completion signal from said processor elements, causes the configuration data for configuring the next calculation state to output from said configuration data memory.

3. The reconfigurable integrated circuit device according to claim 1, wherein each of said arithmetic units comprises an input port, a calculator which performs predetermined calculation processing on input data from said input port, a register which latches the output of said calculator in response to a clock signal, and an output port which outputs the data in said register; and wherein each of said arithmetic units performs said predetermined calculation processing and outputs its calculation result in one clock cycle.

4. The reconfigurable integrated circuit device according to claim 3, wherein said calculator comprises a combination of a plurality of calculators selected from a group including, at least, a mask processor which performs partial bit masking, a multiplier, a cumulative adder, and an ALU calculator which performs addition, subtraction, and logical operation.

5. The reconfigurable integrated circuit device according to claim 1, wherein, in said processor elements, said intra-processor element network is configured based on said configuration data so that the plurality of incorporated arithmetic units are connectable in series in an arbitrary order.

6. The reconfigurable integrated circuit device according to claim 1, wherein, in said processor elements, said intra-processor element network is configured based on said configuration data so that a single incorporated arithmetic unit outputs the result of calculation processing at said output terminal in a single clock cycle.

7. A reconfigurable integrated circuit device which converts an arbitrary calculation state dynamically, based on configuration data, comprising:
- a plurality of processor elements, each of which comprises a plurality of input terminals, an output terminal, a plurality of arithmetic units which are provided in parallel and each of which performs calculation processing in synchronous with a clock signal, and an intra-processor element network which connects together said input terminals, and input and output ports of said plurality of arithmetic units in an arbitrary state;
- an inter-processor element network which connects between said plurality of processor elements in an arbitrary state; and
- a control unit which supplies configuration data to said intra-processor element network and to said inter-processor element network;
- wherein
- said intra-processor element network has a plurality of first selectors, provided corresponding to all of the input ports of said plurality of arithmetic units, each of which has inputs connected to all of the input terminals and directly connected to all of the output ports of said arithmetic units, and an output connected to the corresponding input port of the arithmetic unit,
- said intra-processor element network further has a second selector having inputs connected to all of the output ports of the arithmetic units and an output connected to the output terminal,
- said intra-processor element network can be reconfigured to a desired connection state based on configuration data provided to the input selectors and the output selector, and further, said inter-processor element network can be reconfigured to a desired connection state based on said configuration data; and
- wherein each of said arithmetic units outputs its calculation processing result at a latency of one clock cycle.

8. A reconfigurable integrated circuit device which converts an arbitrary calculation state dynamically, based on configuration data, comprising:
- a plurality of processor elements, each of which comprises a plurality of input terminals, an output terminal, a plurality of arithmetic units which are provided in parallel and each of which performs calculation processing in synchronous with a clock signal, and an intra-processor element network which connects together said input terminals, and input and output ports of said plurality of arithmetic units in an arbitrary state; and
- an inter-processor element network which connects between said plurality of processor elements in an arbitrary state, wherein:
- said intra-processor element network has a plurality of first selectors, provided corresponding to all of the input ports of said plurality of arithmetic units, each of which has inputs connected to all of the input terminals and all of the output ports of said arithmetic units, and an output connected to the corresponding input port of the arithmetic unit, and which selects a signal among the all of the input terminals and all of the output ports of said arithmetic units so as to output the selected signal to said output,
- said intra-processor element network further has a second selector having inputs connected to all of the output ports of the arithmetic units and an output connected to the output terminal,
- said intra-processor element network is reconfigurable to a desired connection state based on configuration data provided to the first selectors and the second selector, and further, said inter-processor element network is reconfigurable to a desired connection state based on said configuration data.

* * * * *